United States Patent [19]

Scott et al.

[11] Patent Number: 5,502,121

[45] Date of Patent: Mar. 26, 1996

[54] BLENDS OF POLYARYLATES WITH ALIPHATIC POLYESTERS

[75] Inventors: Christopher E. Scott, Watertown, Mass.; James D. Small, Jr., Blountville; Hsinjin Yang, Johnson City, both of Tenn.; Paul D. Yacobucci, Rochester, N.Y.; Gary M. Stack, Kingsport, Tenn.

[73] Assignee: Eastman Chemical Company, Kingsport, Tenn.

[21] Appl. No.: 316,000

[22] Filed: Sep. 30, 1994

[51] Int. Cl.$^6$ ............................................. C08L 67/03
[52] U.S. Cl. ............................................. 525/444; 525/448
[58] Field of Search ............................. 525/444; 528/176, 528/193

[56] References Cited

U.S. PATENT DOCUMENTS

| | | | |
|---|---|---|---|
| H506 | 8/1988 | Asada | 528/193 |
| 2,071,250 | 2/1937 | Carothers . | |
| 2,071,251 | 2/1937 | Carothers . | |
| 2,465,319 | 3/1949 | Whinfield et al. . | |
| 3,047,539 | 7/1962 | Pengilly . | |
| 3,317,464 | 5/1967 | Conix . | |
| 3,780,148 | 12/1973 | Jackson et al. . | |
| 3,824,213 | 7/1974 | Stackman . | |
| 3,948,856 | 4/1976 | Stackman . | |
| 4,137,278 | 1/1979 | Lemper | 525/444 |
| 4,286,075 | 8/1981 | Robeson et al. . | |
| 4,379,892 | 4/1983 | Ueno et al. . | |
| 5,236,988 | 8/1993 | Doyama | 525/444 |

OTHER PUBLICATIONS

M. M. Coleman, C. J. Serman, D. E. Bhagwagar, P. C. Painter, *Polymer,* 31, 1187 (1990).

Encyclopedia of Polymer Science and Engineering [2nd Edition, John Wiley and Sons, 1988, vol. 12, p. 28].

*Primary Examiner*—Patricia A. Short
*Attorney, Agent, or Firm*—Karen A. Harding; Harry J. Gwinnell

[57] ABSTRACT

This invention relates to a visually clear blend comprising:

(A) about 1 to 99 weight % of a polyarylate based on alkylbisphenol-A, and (B) about 99 to 1 weight % of an aliphatic polyester.

13 Claims, No Drawings

BLENDS OF POLYARYLATES WITH ALIPHATIC POLYESTERS

FIELD OF THE INVENTION

This invention relates to blends of aliphatic polyesters with poly(alkylbisphenol-A terephthalate), poly(alkylbisphenol-A-isophthalate), and copolymers thereof.

BACKGROUND OF THE INVENTION

Polyarylates based on an alkylbisphenol-A are excellent molding plastics for high temperature applications. They have high glass transition temperatures and excellent clarity. For example, poly(tetramethylbisphenol-A-terephthalate) has a Tg (glass transition temperature) of 234° C. However, the high Tg of these materials also means that high processing temperatures must be used in order to process them. Blending with another polymer is often used to reduce the melt viscosity of a polymer and thus improve processability. However, clarity is required in many applications. Most blends of two polymers are opaque.

Robeson and Skoler in U.S. Pat. No. 4,286,075 disclosed blends of a)poly(ethylene terephthalate) with b) poly-(bisphenol-A terephthalate, poly(bisphenol-A isophthalate), and copolymers thereof. These blends were clear and exhibited a single glass transition temperature, indicating the presence of a single phase solid solution. However, they disclosed only blends of polyarylates with polyesters prepared from aromatic acids.

Ueno et al. in U.S. Pat. No. 4,379,892 disclose transparent blends of poly(alkylene terephthalates) with poly(bisphenol-A terephthalate), poly(bisphenol-A isophthalate), and copolymers thereof. Blends with polyesters prepared from primarily aliphatic acids are not disclosed.

SUMMARY OF THE INVENTION

The present invention concerns blends of polyarylates with polyesters prepared from primarily aliphatic acids.

More particularly, the present invention relates to a blend comprising:

(A) about 1 to 99 weight % of a polyarylate based on alkylbisphenol-A having the structure:

$$\left[O-\underset{R_3}{\overset{R_1}{\bigcirc}}\underset{R_4}{\overset{R_2}{\bigcirc}}-\underset{CH_3}{\overset{CH_3}{\underset{|}{C}}}-\underset{R_7}{\overset{R_5}{\bigcirc}}\underset{R_8}{\overset{R_6}{\bigcirc}}-O-\underset{O}{\overset{O}{\underset{\|}{C}}}-\bigcirc-\underset{O}{\overset{\|}{C}}\right]_n$$

wherein $R_1$, $R_2$, $R_3$, $R_4$, $R_5$, $R_6$, $R7$, $R_8$ are selected from the group consisting of —H, —$CH_3$, —$CH_2CH_3$, with the proviso that at least one of $R_1$, $R_2$, $R_3$, $R_4$, $R_5$, $R_6$, R7, and $R_8$ is either —$CH_3$ or —$CH_2CH_3$, and wherein n is an integer of 5 or greater, and (B) about 99 to 1 weight % of an aliphatic polyester comprising linear acids or cycloaliphatic acids having rings comprising six or more carbons and linear glycols or cycloaliphatic glycols having rings comprising six or more carbon atoms;

wherein an article prepared from said blend is visually clear having a diffuse transmittance value of 40% or greater as determined by ASTM Method D1003.

A key feature is the presence of alkyl substituents on the aromatic rings of the polyarylates in the blends of the present invention.

The blends of the invention are unexpectedly clear while maintaining good physical properties.

DETAILED DESCRIPTION OF THE PREFERRED EMBODIMENTS

The novel polyarylate/aliphatic polyester blends are comprised of:

(A) about 1 to 99% wt. of a polyarylate based on alkylbisphenol-A:

$$\left[O-\underset{R_3}{\overset{R_1}{\bigcirc}}\underset{R_4}{\overset{R_2}{\bigcirc}}-\underset{CH_3}{\overset{CH_3}{\underset{|}{C}}}-\underset{R_7}{\overset{R_5}{\bigcirc}}\underset{R_8}{\overset{R_6}{\bigcirc}}-O-\underset{O}{\overset{O}{\underset{\|}{C}}}-\bigcirc-\underset{O}{\overset{\|}{C}}\right]_n$$

wherein $R_1$, $R_2$, $R_3$, $R_4$, $R_5$, $R_6$, $R_7$, $R_8$ are selected from the group consisting of —H, —$CH_3$, —$CH_2CH_3$, with the proviso that at least one of $R_1$, $R_2$, $R_3$, $R_4$, $R_5$, $R_6$, $R_7$, and $R_8$ is either —$CH_3$ or —$CH_2CH_3$, and wherein n is an integer of 5 or greater.

It is preferred that $R_1$ and $R_6$ are methyl and $R_2$, $R_3$, $R_4$, $R_5$, $R_7$ and $R_8$ are hydrogen. It is also preferred that $R_1$, $R_3$, $R_6$, and $R_8$ are methyl, and $R_2$, $R_4$, $R_5$, and $R_7$ are hydrogen.

Examples of these polyarylates include:

poly(tetramethylbisphenol-A terephthalate): (PTMBT)

poly(tetramethylbisphenol-A isophthalate): (PTMBI)

poly(dimethylbisphenol-A terephthalate): (PDMBT)

poly(dimethylbisphenol-A isophthalate): (PDMBI)

along with poly(tetramethylbisphenol-A-terephthalate-co-isophthalate) and poly(dimethylbisphenol-A-terephthalate-co-isophthalate) copolymers of varying terephthalate/isophthalate compositions.

These polyarylates may be prepared by one skilled in the art; for example, by the reaction of acid chlorides of aromatic dicarboxylic acids with dihydric phenols; the reaction of diaryl esters of the aromatic dicarboxylic acids with dihydric phenols; or the reaction of aromatic diacids with diester derivatives of dihydric phenols. These polyarylates may be prepared with procedures similar to those disclosed in U.S. Pat. Nos. 3,317,464; 3,948,856; 3,780,148; and 3,824,213.

The inherent viscosity of the polyarylate portion of this invention is at least 0.3 dL/g but preferably 0.5 dL/g or more.

Component (B) of this invention comprises:

about 99 to 1% wt. of an aliphatic polyester which forms a clear binary blend with the polyarylate.

Polyesters which generally form clear blends are formed from certain acids which are linear or cycloaliphatic with rings including six or greater carbons with certain glycols which are linear or cycloaliphatic with rings including six or greater carbons. Such aliphatic polyesters may be formed from the reaction of, for example, the following acids, or equivalent alkyl esters:

oxalic acid
malonic acid
succinic acid
glutaric acid
adipic acid
pimelic acid
suberic acid
azelaic acid
sebacic acid
1,12-dodecanedioic acid
cis/trans-1,4-cyclohexane-dicarboxylic acid
1,3-cyclohexanedicarboxylic acid with, for example, the following glycols:

ethylene glycol
1,3-trimethylene glycol
1,4-butanediol
1,5-pentanediol
1,6-hexanediol
1,7-heptanediol
1,8-octanediol
1,9-nonanediol
1,10-decanediol
1,12-dodecanediol
neopentyl glycol
cis/trans-1,4-cyclohexanedimethanol
1,3-cyclohexanedimethanol
diethylene glycol.

The designation cis/trans indicates that the molecule may be used in either the cis or trans configuration, or a mixture of both.

The inherent viscosity of the polyester portion of this invention is at least 0.2 dL/g, preferably 0.4 dL/g or more.

Copolymers of these aliphatic polyesters may also form clear blends with the polyarylates. In addition, these polyesters or copolyesters thereof may be modified with minor amounts of other acids or glycols and still maintain clarity in the blends. Such glycols and acids include, but are not limited to:

dimethylmalonic acid
terephthalic acid
isophthalic acid
phthalic acid
2,6-naphthalenedicarboxylic acid
carbonic acid
2,2,4,4-tetramethyl-1,3-cyclobutanediol
bisphenol A
hydroquinone.

The acids or glycols or modifying acids or glycols which may be incorporated into the polyester while still achieving a clear, single phase blend depend on the particular acids and glycols which are used.

Although it is not intended for this invention to be limited by any particular theory, the polyester and copolyester compositions which will produce single phase, clear materials may be generally determined using the method of Coleman et al. [M. M. Coleman, C. J. Serman, D. E. Bhagwagar, P. C. Painter, Polymer, 31, 1187 (1990).] for prediction of polymer-polymer miscibility.

For instance, in the particular case of poly(tetramethylbisphenol-A terephthalate), or poly(tetramethylbisphenol-A isophthalate), or copolymers thereof, polyesters with solubility parameters between about 9.0 $(\text{cal.cm}^{-3})^{0.5}$ and about 9.6$(\text{cal.cm})^{-3})^{0.5}$ as calculated by the method of Coleman et al. generally form single phase, clear blends. However, there are minor exceptions to this rule, as demonstrated herein. Exceptions to this rule are generally found to be:

a) non-linear acids or glycols; and b) cycloaliphatic acids or glycols with rings including less than six carbon atoms.

These polyesters may be prepared by one skilled in the art; for example, with procedures similar to those disclosed in the Encyclopedia of Polymer Science and Engineering [$2^{nd}$ Edition, John Wiley and Sons, 1988, Vol. 12, p. 28] as well as U.S. Pat. Nos. 2,071,250; 2,071,251; 2,465,319 and 3,047,539. Such polymerizations are usually carried out at temperatures from 150° C. to 300° C. in the presence of polycondensation catalysts. The catalysts are typically employed in amounts between 10 to 1000 ppm, based on the total weights of reactants.

Preferable embodiments of this invention comprise:

(A) about 95% to 60%, more preferably 95% to 80%, and even more preferably, 95% to 90% wt. of the polyarylate and (B) about 5% to 40%, more preferably 5% to 20%, and even more preferably 5% to 10% wt. of an aliphatic polyester.

Preferred aliphatic polyesters of the invention include poly(hexylene glutarate), poly(1,4-cyclohexanedimethylene adipate), poly(butylene azelate), poly(ethylene sebacate), poly(hexylene 1,4-cyclohexanedicarboxylate), poly(1,4-cyclohexanedimethylene adipate), poly(octyleneazelate), and poly(1,4-cyclohexane-dimethylene 1,4-cyclohexanedicarboxylate).

Preferred polyarylates comprise: poly(dimethyl-bisphenol-A terephthalate), poly(dimethylbisphenol-A isophthalate), and copolymers thereof.

Preferred aliphatic polyesters comprise: poly(1,4-cyclohexane-dimethylene adipate), poly(1,4-cyclohexanedimethylene cis/trans-1,4-cyclohexanedicarboxylate), poly(hexylene glutarate), and poly(ethylene sebacate).

These blends are compounded in the melt, for example, by using a single screw or twin screw extruder. They may also be prepared from a mutual solvent, such as methylene chloride. Additional component such as stabilizers, fillers, flame retardants, colorants, lubricants, release agents, impact modifiers and the like may also be incorporated into the formulation.

Whenever the term "inherent viscosity" (I.V.) is used in this application, it will be understood to refer to viscosity determinations made at 25° C. using 0.5 gram of polymer per 100 ml of a solvent comprising 60 weight % phenol and 40 weight % tetrachloroethane.

A "visually clear" blend is defined herein as one where the article made therefrom has a diffuse transmittance value of 40% or greater.

The diffuse transmittance of injection molded articles is a measure of the visual clarity of the articles and is determined by ASTM Method D1003.

All percentages herein are percentages by weight unless otherwise noted.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Blends of poly(tetramethylbisphenol-A terephthalate) (PTMBT) with various aliphatic polyesters were prepared and evaluated. The poly(tetramethylbisphenol-A terephthalate) was prepared by reaction of 2,2-bis(4-hydroxy-3,5dimethylphenyl)propane with terephthaloyl chloride in methylene chloride solution:

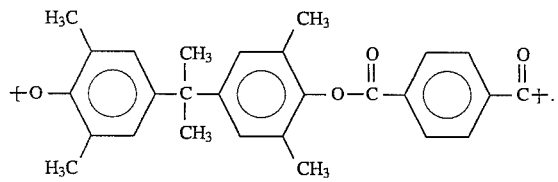

The aliphatic polyesters were prepared by reaction in the melt state of the indicated acids and glycols. These binary blends were prepared from methylene chloride solution and tested for thermal properties and clarity. The solution blends were prepared at a 50/50 composition in methylene chloride and precipitated into methanol. The precipitated blend was then collected and dried under vacuum at 50° C. for approximately three days. Thin films of the blend were melt pressed at ≈280° C. and the clarity determined by visual inspection. The blends were tested by differential scanning calorimetry (DSC) in order to determine the glass transition temperature ($T_g$), crystallization-temperature ($T_c$), and melting temperature ($T_m$). Particular note was taken as to whether each blend exhibited one or two glass transition temperatures, intermediate between the glass transition temperatures of the poly(tetramethylbisphenol-A terephthalate) and the aliphatic polyester. The presence of a single intermediate $T_g$ indicates that the blend has formed a one phase system. Such blends are generally clear.

The results of this investigation are presented in Table I. In Examples IF, II, IJ, IK, IL, IN, IP and IR, the films prepared from the blends were unexpectedly clear. Clarity of binary blends is a rather rare occurrence. The other examples presented in Table I show that there are also a large number of aliphatic polyesters which form opaque blends with poly(tetramethylbisphenol-A terephthalate).

The solubility parameter of the aliphatic polyester which was calculated using the method of Coleman et al. [M. M. Coleman, C. J. Serman, D. E. Bhagwagar, P. C. Painter, Polymer, 31, 1187 (1990).] is also given. Note that aliphatic polyesters with solubility parameters in the range of about 9.0 $(cal.cm^{-3})^{0.5}$ to about 9.6 $(cal.cm^{-3})^{0.5}$ generally form clear, single phase films when blended with poly(tetramethylbisphenol-A terephthalate). However, aliphatic polyesters with solubility parameters above about 9.6 $(cal.cm^{-3})^{0.5}$ form opaque films when blended with poly(tetramethylbisphenol-A terephthalate). There are exceptions to this general rule, as demonstrated in Examples ID, IO and IQ. Examples ID and IO include polyesters formed from neopentyl glycol, which is not a linear glycol. Example IQ includes a polyester formed from 2,2,4,4-tetramethyl-1,3-cyclobutanediol, which includes a cycloaliphatic ring of less than six carbons.

Example 2

Blends of poly(tetramethylbisphenol-A isophthalate) with various aliphatic polyesters were prepared and evaluated. The procedures used were the same as those described in Example 1. Results of the evaluations are presented in Table II. Examples IID, IIE and IIH are unexpectedly clear blends.

Example 3

Blends of poly(tetramethylbisphenol-A terephthalate-co-isophthalate) with various aliphatic polyesters were prepared and evaluated. The poly(tetramethylbisphenol-A terephthalate-co-isophthalate) was prepared by reaction of tetramethyl bisphenol A with a mixture of 52% terephthaloyl chloride and 48% isophthaloyl chloride in methylene chloride solution. The procedures used were the same as those described in Example 1. Examples IIIC, IIIE and IIIF are unexpectedly clear.

Example 4

Blends of a poly(dimethylbisphenol-A terephthalate), specifically, the reaction product of 2,2-bis(4-hydroxy-3-methylphenyl)propane with terephthaloyl chloride:

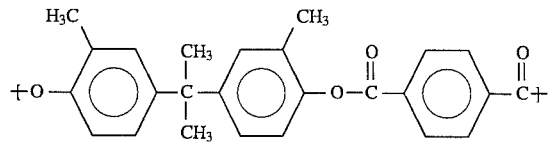

with various aliphatic polyesters were prepared and evaluated. The procedures used were the same as those described in Example 1. Results of the evaluations are presented in Table IV. Examples IVG and IVK are unexpectedly clear blends.

Example 5

Blends of a poly(dimethylbisphenol-A isophthalate), specifically, the reaction product of 2,2-bis(4-hydroxy-3-methylphenyl)propane with isophthaloyl chloride:

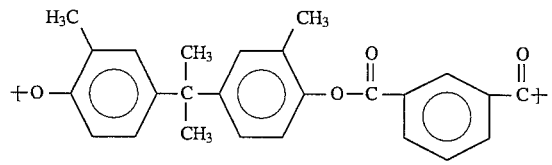

with various aliphatic polyesters were prepared and evaluated. The procedures used were the same as those described in Example 1. Results of the evaluations are presented in Table V. Examples VG and VK are unexpectedly clear blends.

Example 6

For comparison with the results of the previous examples, blends of poly-(bisphenol-A terephthalate-co-isophthalate) with various aliphatic polyesters were prepared. The acid portion of this polymer was formed from 50% terephthalic acid and 50% isophthalic acid. These blends are different from those of the present invention due to the absence of alkyl substituents on the aromatic rings of the polyarylate:

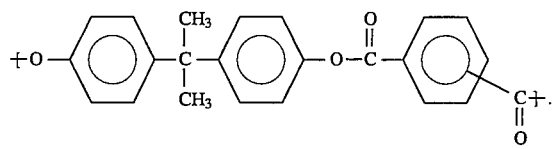

These blends were prepared in a similar manner to those described in Example 1.

The results presented in Table II demonstrate that blends of this polyarylate with several aliphatic polyesters do not form clear solid phase materials. Comparison of these results with those presented in Examples 1 through 5, clearly indicate the key feature of the alkyl substituents on the aromatic rings of the polyarylates in the blends of the present invention.

TABLE I

| Example # | Aliphatic Polyester Composition | | Sol. Par. $(cal \cdot cm^{-3})^{0.5}$ | Film Clarity | DSC Result No. of Tgs |
|---|---|---|---|---|---|
| | Acid | Glycol | | | |
| IA | succinic acid | ethylene glycol | 10.7 | Opaque | Two |
| IB | succinic acid | 1,4-butanediol | 10.0 | Opaque | Two |
| IC | succinic acid | 1,6-hexanediol | 9.7 | Opaque | Two |
| ID | succinic acid | neopentyl glycol | 9.5 | Opaque | Two |
| IE | glutaric acid | 1,4-butanediol | 9.8 | Opaque | Two |
| IF | glutaric acid | 1,6-hexanediol | 9.5 | Clear | One |
| IG | adipic acid | ethylene glycol | 10.0 | Opaque | Two |
| IH | adipic acid | 1,4-butanediol | 9.7 | Opaque | Two |
| II | adipic acid | 1,4-cyclohexane-dimethanol | 9.5 | Clear | nd |
| IJ | azelaic acid | 1,4-butanediol | 9.3 | Clear | nd |
| IK | azelaic acid | 1,8-octanediol | 9.0 | Clear | nd |
| IL | sebacic acid | ethylene glycol | 9.4 | Clear | One |
| IM | trans-1,4-cyclohexane-dicarboxylic acid | ethylene glycol | 10.1 | Opaque | Two |
| IN | trans-1,4-cyclohexane-dicarboxylic acid | 1,6-hexanediol | 9.5 | Clear | One |
| IS | trans-1,4-cyclohexane-dicarboxylic acid | neopentyl glycol | 9.3 | Opaque | Two |
| IP | trans-1,4-cyclohexane-dicarboxylic acid | 1,4-cyclohexanedimethanol | 9.5 | Clear | One |
| IQ | trans-1,4-cyclohexane-dicarboxylic acid | 2,2,4,4-tetramethyl-1,3-cyclobutanediol | 9.1 | Opaque | nd |
| IR | cis,trans-1,4-cyclohexane-dicarboxylic acid | 1,4-cyclohexane-dimethanol | 9.5 | Clear | One | nd: not determined

TABLE II

| Example # | Aliphatic Polyester Composition | | Sol. Par. $(cal \cdot cm^{-3})^{0.5}$ | Film Clarity | DSC Result No. of Tgs |
|---|---|---|---|---|---|
| | Acid | Glycol | | | |
| IIA | succinic acid | 1,4-butanediol | 10.0 | Opaque | nd |
| IIB | succinic acid | 1,6-hexanediol | 9.7 | Opaque | Two |
| IIC | succinic acid | neopentyl glycol | 9.5 | Opaque | Two |
| IID | glutaric acid | 1,6-hexanediol | 9.5 | Clear | nd |
| IIE | sebacic acid | ethylene glycol | 9.4 | Clear | nd |
| IIF | trans-1,4-cyclohexane-dicarboxylic acid | ethylene glycol | 10.1 | Opaque | nd |
| IIG | trans-1,4-cyclohexane-dicarboxylic acid | neopentyl glycol | 9.3 | nd | Two |
| IIH | trans-1,4-cyclohexane-dicarboxylic acid | 1,4-cyclohexane-dimethanol | 9.5 | Clear | One | nd: not determined

TABLE III

| Example # | Aliphatic Polyester Composition | | Sol. Par. (cal · cm⁻³)^0.5 | Film Clarity | DSC Result No. of Tgs |
|---|---|---|---|---|---|
| | Acid | Glycol | | | |
| IIIA | succinic acid | ethylene glycol | 10.7 | Opaque | nd |
| IIIB | glutaric acid | 1,4-butanediol | 9.8 | Opaque | nd |
| IIIC | azelaic acid | 1,4-butanediol | 9.3 | Clear | nd |
| IIID | trans-1,4-cyclohexane-dicarbo,ylic acid | ethylene glycol | 10.1 | Opaque | nd |
| IIIE | trans-1,4-cyclohexane-dicarbo,ylic acid | 1,6-hexanediol | 9.5 | Clear | nd |
| IIIF | cis trans-1,4-cyclohexane-dicarboxylic acid | 1,4-cyclohexane-dimethanol | 9.5 | Clear | nd | nd: not determined

TABLE IV

| Example # | Aliphatic Polyester Composition | | Sol. Par. (cal · cm⁻³)^0.5 | Film Clarity | DSC Result No. of Tgs |
|---|---|---|---|---|---|
| | Acid | Glycol | | | |
| IVA | succinic acid | ethylene glycol | 10.7 | Opaque | Two |
| IVB | succinic acid | 1,4-butanediol | 10.0 | Opaque | Two |
| IVC | succinic acid | 1,6-hexanediol | 9.7 | Opaque | Two |
| IVD | glutaric acid | 1,6-hexanediol | 9.5 | Opaque | Two |
| IVE | adipic acid | ethylene glycol | 10.0 | Opaque | Two |
| IVF | adipic acid | 1,4-butanediol | 9.7 | Opaque | Two |
| IVG | adipic acid | 1,4-cyclohexane- | 9.5 | Clear | One |
| IVH | azelaic acid | 1,4-butanediol | 9.3 | Opaque | Two |
| IVI | azelaic acid | 1,8-octanediol | 9.0 | Opaque | Two |
| IVJ | sebacic acid | ethylene glycol | 9.4 | Opaque | Two |
| IVK | trans-1,4-cyclohexane-dicarboxylic acid | 1,4-cyclohexane-dimethanol | 9.5 | Clear | One |

TABLE V

| Example # | Aliphatic Polyester Composition | | Sol. Par. (cal · cm⁻³)^0.5 | Film Clarity | DSC Result No. of Tgs |
|---|---|---|---|---|---|
| | Acid | Glycol | | | |
| VA | succinic acid | ethylene glycol | 10.7 | Opaque | Two |
| VB | succinic acid | 1,4-butanediol | 10.0 | Opaque | Two |
| VC | succinic acid | 1,6-hexanediol | 9.7 | Opaque | Two |
| VD | glutaric acid | 1,6-hexanediol | 9.5 | Opaque | Two |
| VE | adipic acid | ethylene glycol | 10.0 | Opaque | Two |
| VF | adipic acid | 1,4-butanediol | 9.7 | Opaque | Two |
| VG | adipic acid | 1,4-cyclohexane-dimethanol | 9.5 | Clear | One |
| VH | azelaic acid | 1,4-butanediol | 9.3 | Opaque | Two |
| VI | azelaic acid | 1,8-octanediol | 9.0 | Opaque | Two |
| VJ | sebacic acid | ethylene glycol | 9.4 | Opaque | Two |
| VK | trans-1,4-cyclohexane-dicarboxylic acid | 1,4-cyclohexane-dimethanol | 9.5 | Clear | One |

TABLE VI

| Example # | Aliphatic Polyester Composition | | Film Clarity | DSC Result No. of Tgs |
|---|---|---|---|---|
| | Acid | Glycol | | |
| VIA | succinic acid | ethylene glycol | Opaque | Two |
| VIB | succinic acid | 1,4-butanediol | Opaque | Two |
| VIC | glutaric acid | 1,6-hexanediol | | |
| VID | adipic acid | ethylene glycol | Opaque | Two |
| VIE | adipic acid | 1,4-butanediol | Opaque | Two |
| VIF | azelaic acid | 1,4-butanediol | Opaque | Two |
| VIG | azelaic acid | 1,8-octanediol | Opaque | Two |
| VIH | sebacic acid | ethylene glycol | Opaque | Two |
| VII | trans-1,4-cyclohexanedicarboxylic | ethylene glycol | Opaque | Two |

TABLE VI-continued

| Example # | Aliphatic Polyester Composition | | Film Clarity | DSC Result No. of Tgs |
|---|---|---|---|---|
| | Acid | Glycol | | |
| VIJ | trans-1,4-cyclo-hexanedicarboxylic acid | 1,4-butanediol | Opaque | nd |
| VIK | trans-1,4-cyclo-hexanedicarboxylic acid | 1,6-hexanediol | Opaque | nd | nd: not determined

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A blend comprising:

(A) about 1 to 99 weight % of a polyarylate based on alkylbisphenol-A having the structure:

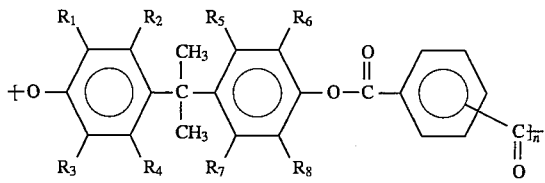

wherein $R_1$, $R_2$, $R_3$, $R_4$, $R_5$, $R_6$, $R_7$, $R_8$ are selected from the group consisting of —H, —$CH_3$, —$CH_2CH_3$, with the proviso that at least one of $R_1$, $R_2$, $R_3$, $R_4$, $R_5$, $R_6$, $R_7$, and $R_8$ are either —$CH_3$ or —$CH_2CH_3$, and wherein n is an integer of 5 or greater, and (B) about 99 to 1 weight % of an aliphatic polyester comprising linear acids or cycloaliphatic acids having rings comprising six or more carbons and linear glycols or cycloaliphatic glycols having rings comprising six or more carbon atoms;

wherein an article prepared from said blend is visually clear having a diffuse transmittance value of 40% or greater as determined by ASTM Method 1003.

2. A blend according to claim 1 wherein component (A) is present at about 95 to 60 weight % and component (B) is present at about 5 to 40 weight %.

3. A blend according to claim 1 wherein component (A is present at 95 to 80 weight % and component (B) is present at 5 to 20 weight %.

4. A blend according to claim 1 wherein said linear or cycloaliphatic acids are selected from the group consisting of: oxalic acid, malonic acid, succinic acid, glutaric acid, adipic acid, pimelic acid, suberic acid, azelaic acid, sebacic acid, 1,12-dodecanedioic acid, cis/trans-1,4-cyclohexanedicarboxylic acid, and 1,3-cyclohexanedicarboxylic acid.

5. A blend according to claim 1 wherein said glycols are selected from the group consisting of: ethylene glycol, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, cis/trans-1,4-cyclohexanedimethanol, 1,3-cyclohexanedimethanol, and diethylene glycol.

6. A blend according to claim 1 wherein said polyarylate is selected from the group consisting of poly(tetramethylbisphenol-A terephthalate), poly(tetramethylbisphenol-A isophthalate), poly(dimethylbisphenol-A terephthalate), and poly(dimethylbisphenol-A isophthalate), and copolymers thereof.

7. The blend of claim 1 wherein said polyarylate contains R groups as follows: $R_1$ and $R_6$ are methyl and $R_2$, $R_3$, $R_4$, $R_5$, $R_7$ and $R_8$ are hydrogen.

8. A blend according to claim 7 wherein said polyarylate is selected from the group consisting of poly (dimethylbisphenol-A terephthalate), poly (dimethylbisphenol-A isophthalate), and copolymers thereof.

9. A blend according to claim 1 wherein said aliphatic polyester is selected from the group consisting of poly(hexylene glutarate), poly(1,4-cyclohexanedimethylene adipate), poly(butylene azelate), poly(ethylene sebacate), poly(hexylene 1,4-cyclohexanedicarboxylate), poly(1,4-cyclohexanedimethylene adipate), poly(octylene azelate), and poly(1,4-cyclohexanedimethylene 1,4-cyclohexanedicarboxylate).

10. A blend according to claim 9 wherein said aliphatic polyester is selected from the group consisting of poly(1,4-cyclohexanedimethylene adipate), poly(1,4-cyclohexanedimethylene cis/trans-1,4-cyclohexanedicarboxylate), poly(hexylene glutarate), and poly(ethylene sebacate).

11. The blend of claim 1 wherein said $R_1$, $R_3$, $R_6$ and $R_8$ are methyl and $R_2$, $R_4$, $R_5$, and $R_7$ are hydrogen.

12. The blend of claim 11 wherein said polyarylate is selected from the group consisting of poly (tetramethylbisphenol-A terephthalate) and poly (tetramethylbisphenol-A isophthalate), and copolymers thereof.

13. A molded article prepared with the composition claim 1.

* * * * *